United States Patent [19]

Rodriguez

[11] 4,350,939
[45] Sep. 21, 1982

[54] SPINDLE ORIENT DEVICE

[75] Inventor: Celestino Rodriguez, Westland, Mich.

[73] Assignee: The Bendix Corporation, Southfield, Mich.

[21] Appl. No.: 193,674

[22] Filed: Oct. 3, 1980

[51] Int. Cl.³ .............................................. G05B 11/18
[52] U.S. Cl. .................................... 318/592; 318/594; 318/631
[58] Field of Search ............... 318/592, 594, 596, 561, 318/631

[56] References Cited

U.S. PATENT DOCUMENTS

| | | |
|---|---|---|
| 3,020,459 | 2/1962 | Feigleson . |
| 3,395,323 | 7/1968 | Peters . |
| 3,487,283 | 12/1969 | Cook . |
| 3,636,425 | 1/1972 | Dickinson et al. . |
| 3,721,882 | 3/1973 | Helms ................................ 318/594 |
| 3,757,232 | 9/1973 | Matsuda . |
| 3,777,125 | 12/1973 | Whetham . |
| 3,839,664 | 10/1974 | Dirks et al. ......................... 318/594 |
| 4,207,504 | 6/1980 | Kawada et al. ..................... 318/561 |

Primary Examiner—J. V. Truhe
Assistant Examiner—Richard M. Moose
Attorney, Agent, or Firm—Markell Seitzman; Russel C. Wells

[57] ABSTRACT

A signal generating means including a half-round magnet attached to the spindle of a machine tool and mounted relative to a first reference indicator and a pair of opposingly mounted magnetic switches magnetically coupled to the magnet and mounted to a stationary portion of the machine tool and aligned relative to a second reference indicator for generating a first signal when the first magnetic switch is activated by the magnet, a second signal when the second magnetic switch is activated by the magnet; gating means, responsive to the first and second signals for generating an orient signal to orient the spindle to a reference position and a controller means for supplying to the spindle driving signals during the normal mode of operation and for supplying to the spindle during the orientation mode orient signals to cause the spindle to become aligned to the reference position.

10 Claims, 3 Drawing Figures

SPINDLE ORIENT DEVICE

BACKGROUND AND SUMMARY OF THE INVENTION

This invention relates to an apparatus for aligning a rotating part such as a spindle of a milling machine to a predetermined reference position.

Apparatus for orientating rotating machinery have found acceptance in the machine tool industries especially for providing a means for accurately and automatically repositioning spindles of milling machines and tool holders for such machines. Traditional spindle systems are expensive and complicated. One such system utilizes a solenoid operated mechanical shotpin to engage an alignment holes on the spindle. Mechanical systems such as these often acquire complicated sequencing logic to properly control the spindle during the alignment or orientation procedure. Alignment or orientation is typically accomplished by stopping the spindle, switching to a low speed gear and then introducing a creep voltage which slowly moves the spindle until the mechanical shotpin engages the alignment hole. Alternatively, alignment or orient can be achieved by using a proximity switches which are activated by magnetic material or original generators. Such devices are illustrated by Cook in U.S. Pat. No. 3,487,283, Peters in U.S. Pat. No. 3,395,323 or by Dickinson et al in U.S. Pat. No. 3,636,425. A problem associated with these systems is that they do not acquire the reference position rapidly, e.g., the reference position is often overshot, therein requiring the spindle to rotate through an entire revolution to regain the reference position. Other orient systems replace the mechanical shotpin and solenoid by utilizing transducers in a feedback position loop as illustrated by Whetham in U.S. Pat. No. 3,777,125. These resolver systems generate feedback pulses and require complicated and extensive signal conditioning electronics.

The present invention relates to a reorientation system for a machine tool having a normal and an orientation mode of operation, comprising: spindle means, including a spindle for rotating relative to a stationary portion of the machine tool in response to electrical signals input thereto, the spindle means includes a first reference indicator located on the spindle and situated perpendicular to the spindle's axis of rotation, and a stationary portion of the machine tool wherein when the first reference indicator is colinear with the second reference indicator, the spindle has achieved a reoriented or reference position.

The invention relates to a system having a signal generating means comprising: a half-round magnet attached to a spindle and mounted relative to a first reference indicator such that the ends of the half-round magnet are aligned to the first reference indicator and a pair of opposingly mounted magnetic switches magnetically coupled to the magnet and mounted to the stationary portion and aligned relative to a second reference indicator for generating a first signal when the first magnetic switch is activated by the magnet and a second signal when the second magnetic switch is activated by the magnet. The system further comprises gating means, responsive to the first and second signals for generating an orient signal wherein the orient signal has a first level during a first interval of time corresponding to the occurrence of the first signal, a second level during a second interval of time corresponding to the occurrence of the second signal and oscillates between the first and the second levels during a third interval of time corresponding to the simultaneous occurrence of the first and the second signals. In addition the system includes a controller means for supplying to the spindle means driving signals during the normal mode of operation to cause the spindle means to rotate at a predetermined speed in a predetermined direction and for supplying to the spindle means during the orientation mode the orient signals to cause the spindle means to be aligned to the reference orientation.

It is a broad object of the present invention to remedy the deficiencies in the prior art. More specifically, it is an object to orient a spinning member to its reference position independent of speed of rotation. It is further object of the present invention to provide a simple, low cost apparatus having few mechanical parts.

DETAILED DESCRIPTION OF THE DRAWINGS

Figure 1:
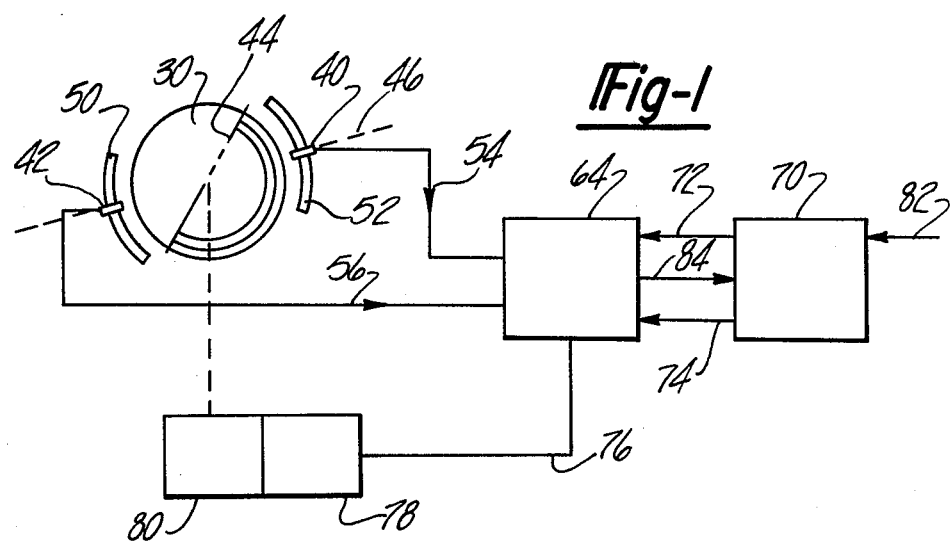
FIG. 1 is schematic diagram of a spindle orient system.

Reference is now made to FIG. 1 which illustrates schematically one embodiment of the present invention. There is illustrated a machine tool including a spindle 30 having mounted thereon a magnet 32 that is operatively situated relative to two opposingly mounted pickoffs or switches 40 and 42 which are responsive to the magnetic field of magnet 32. The magnet 32 may be of the half-round variety of its equivalent and is aligned to a reference mark, line or position 44 on the spindle 30. A corresponding reference position 46, located on the non-rotating part of the machine tool, designates the reference or orient position of the spindle 30. Ideally, the centers of the each pickoff or switch 40 and 42 are aligned to the reference position 46. However, those skilled in the art will appreciate that magnetic proximity switches exhibit a certain amount of hysteresis. Consequently, switch 40 may be located on the reference position 46 and switch 42, which is circumferentially mounted to a movable bracket 50, is offset from position 46 therein, permitting a degree of adjustability to compensate for the hysteresis of the switches 40 and 42. Alternatively, switch 40 can similarly be mounted to another movable bracket 52. In the embodiment illustrated in FIG. 1 switch 40 will generate a periodic first signal whenever activated by the magnetic field of magnet 32. Switch 42 similarly generates a second period signal when confronted by magnet 32. The signals generated by switches 40 and 42 are transmitted over lines 54 and 56 to a programmable interface controller 64. The controller 64 also receives a mode select signal such as a logical signal generated by a numerical processor 70 indicating that the spindle 30 should terminate normal turning operations; slow down and seek the reference position, i.e., to seek orient. In addition, the controller 64 receives power on line 74 which may be transmitted from the processor 70 or from a separate power source.

During normal spindle operating conditions, power is transmitted from the controller 64 via line 76 to the drive electronics 78 of the spindle drive 80. In the embodiment of the invention illustrated in FIG. 1 the spindle drive 80 is a d.c. motor. Those skilled in the art will appreciate that other motors and associated drivers may be substituted therefor. The orientation mode of operation may be initiated in response to an operator command received via line 82 or in response to a command signal automatically generated with the processor 70. In either case the processor 70 will generate, on line 72, the mode select signal instructing the interface controller 64 to terminate normal turning operations and initiate the orient procedure. During this procedure, as discussed in detail below, the interface controller 64 will remove the driving signal received on line 74 and substitute therefor a time varying orient signal.

Figure 2:
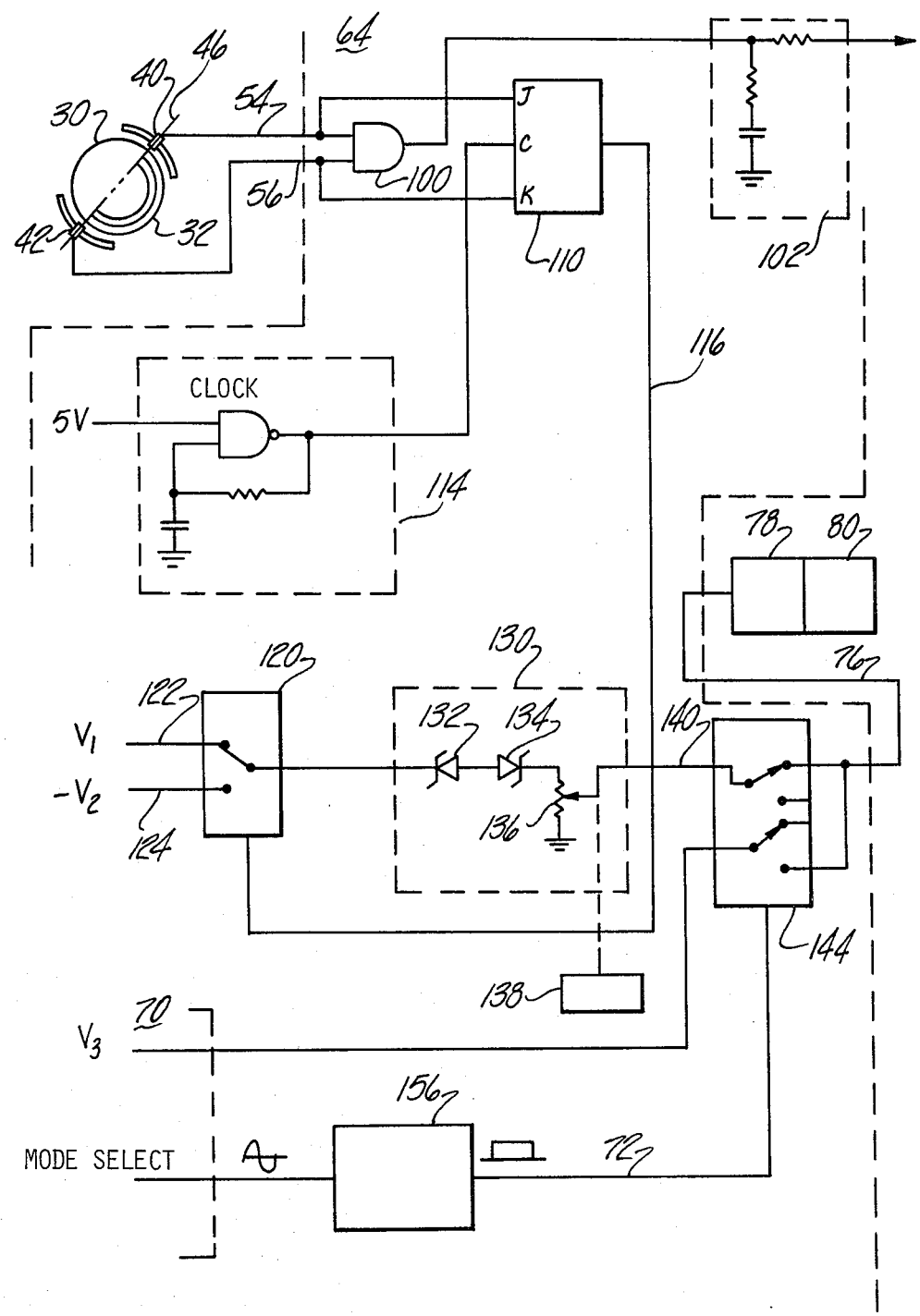
FIG. 2 illustrates a specific embodiment of the spindle orient circuit.

Reference is now made to FIG. 2 which illustrates one embodiment of the present invention. The embodiment of the invention illustrated herein utilizes discrete logic and switching components. Those skilled in the art will appreciate that the logical and switching functions accomplished herein can be programed within a digital programmable interface as disclosed by Simmons in U.S. Pat. No. 4,034,354 and which is expressly incorporated herein by reference.

There is shown the spindle 30 having a half round magnet 32 which is magnetically coupled to switches 40 and 42 in the manner as previously discussed. During the normal mode of operations, that is, when the spindle 30 is rotating and machining a part (not shown), the switches 40 and 42 will produce, on lines 54 and 56, a time series of pulses in response to the rotating magnetic field of the magnet 32. It should be noted that the half round magnet 32 will simultaneously excite both switches 40 and 42 when it is aligned to the reference position 46. Because of the physical size and relative alignment of each switches 40 and 42, the output signals will overlap for a short and predetermined portion of each revolution. The simultaneous output of switches 40 and 42 is an indication that the spindle 30 has achieved alignment with the reference position. The degree of overlap of these two signals will correspond to the size of the switches 40 and 42, their relative placement, the intensity of the magnetic field of magnet 32 and the speed of rotation of the spindle 30. It is however, preferable to maintain this signal overlap as small as possible therein permitting the accurate positioning of the spindle 30 relative to the reference position 46. The output signals from switches 40 and 42, as previously mentioned, are communicated via lines 52 and 54 to the interface controller 64 and more specifically to the AND gate 100. The output of AND gate 100 is communicated to a time delay circuit 102, the output of which is fed back to the processor 70. A sustained logical high value appearing at the output of the time delay circuit 102 indicates that the spindle has stopped and the orient procedure has been accomplished. The output of switch 40 is also communicated to the J input of a J-K flip-flop 110. The output of the switch 42 is similarly communicated to the K input terminal of the flip-flop 110. A clocking signal is input to the flip-flop 110 via line 112 from a clock circuit 114. For applications in the machine tool lathe environment, the clock frequency may be between 100 and 5,000 Hz. The output signal of flip-flop 110 is shown on line 4 of FIG. 3. The operation of the J-K flip-flop 110 is well known. However, the completeness, it is repeated below. If both conditioning inputs (J and K) are disabled prior to a clock pulse, the state of the flip-flop 110 does not change condition when a clock pulse occurs. If the J input is enabled and the K input is disabled, the flip-flop will assume the logical high condition upon the arrival of the next clock pulse. If the K input is enabled and the J input is disabled the flip-flop will assume the O condition when a clock pulse arrives. If both the J and K inputs are enabled prior to the arrival of a clock pulse the flip-flop 110 will compliment or assume the opposite state, thus producing a pulsed or oscillating signal.

The output of the flip-flop 110 is communicated via line 116 to a solid state switch 120. The solid state switch 120 is shown as being adapted to receive reference voltages $V_1$ and $V_2$ on lines 122 and 124. The magnitude of these reference voltages is chosen to be compatible with the rotational rates which will be used during the orient procedure. The reference voltages are preferably chosen to be equal and opposite voltages. In practice, however, the reference voltages may be any convenient magnitude of voltage available from the machine tool or the processor 70. Depending upon the logical state of the output of flip-flop 110, the output voltage of switch 120 will vary between $V_1$ and $-V_2$. The output of switch 120 may be connected to a voltage level shifting circuit 130 to regulate and/or reduce the reference voltages to desirable levels to be used during spindle orient. One such level shifting circuit 130 comprises two opposingly situated zener diodes 132 and 134 which produce a regulated 7.5 volt voltage and the potentiometer 136 having an adjustable center top. The potentiometer 136 is set to produce a determinable or fixed orient rotational rate. Alternatively, the center top of the potentiometer 136 may be driven by a servomechanism 138 to produce a time varying orient signal in response to machine operational parameters such as instaneous spindle speed and/or acceleration. The output of potentiometer 136 is connected via line 140 into the solid state switch 144, the output of which is connected to the drive electronics 78 and spindle drive 80 via line 76. Switch 144 further receives, at another input terminal, an input voltage $V_3$ generated by processor 70. This voltage is normally used to drive the spindle 30 during normal or non-orient periods of operation. Depending upon the state of the switch 144, the output voltage appearing on line 76 will either be the normal drive voltage $V_3$ or the orient signal received from line 140. The logical state of switch 144 is controlled by the mode select signal received on line 72.

The command to orient is issued by the processor 70 or by the operator, will force the mode select signal to 0. In the embodiment shown in FIG. 2, the mode select signal is generated by using a 115 volt a.c. signal that is level shifted by the level shifting circuit 156 to produce a 5 volt logical signal comporting with the requirements of the switch 144. In the embodiment shown, a 0 voltage level input signal to the switch 144 initiates the orientation mode. Voltages greater than zero volts, such as a 5 volt logic signal, indicate normal operation.

Figure 3:
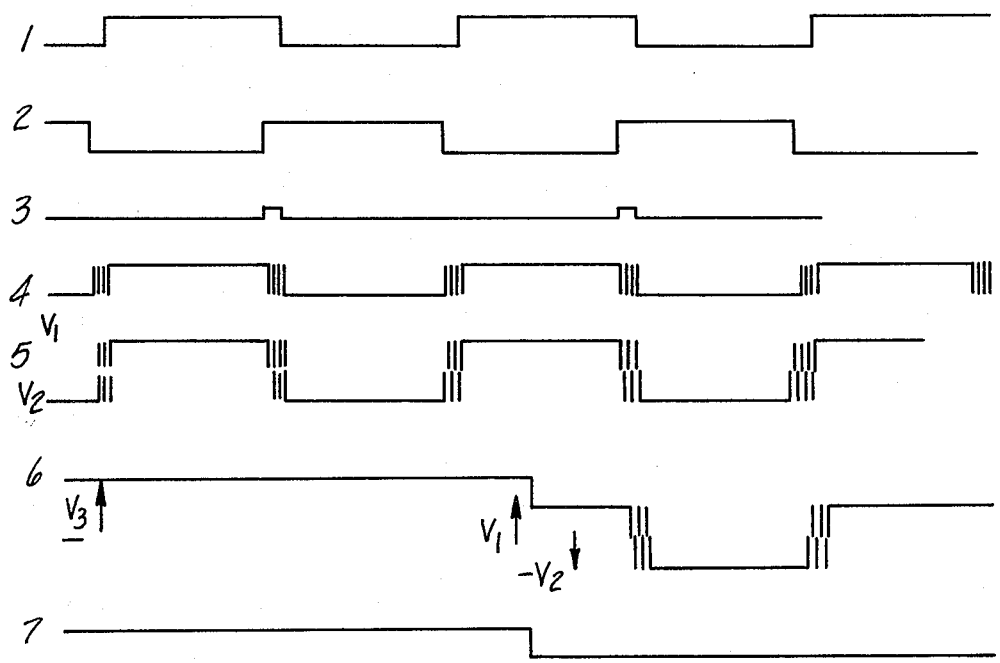
FIG. 3 is a timing diagram showing the signals generated in the circuit of FIG. 2.

The operation of the invention shown in FIGS. 1 and 2 is best understood in conjunction with the waveforms illustrated in FIG. 3. The system has two modes of operation, the normal mode of operation during which time the spindle 30 will be caused to rotate at a determinable speed and the orientation mode during which time the spindle will be commanded to be aligned to the reference position 46. Each mode is selected in response to the mode select signal. As an example: if the MODE SELECT signal is in a logical high state (line 7, FIG. 3), then switch 144 will cause the drive voltage $V_3$ to be communicated to the drive electronics 78. The output of switch 144 during both operational modes is illustrated on line 6 of FIG. 3.

Prior to a discussion of the orientation mode, those signals generated by the switches 40 and 42 and within the controller 64 will be briefly discussed. As the spindle 30 is rotated the magnet 32, in cooperation with with switches 40 and 42, generates a first and second pulse width signal. These signals are illustrated on lines 1 and 2 of FIG. 3. These signals become positive during the time that the magnet 32 is confronting either of the switches 40 or 42. During each half revolution of the spindle 32, both switches 40 and 42 will simultaneously be excited. In response to the momentary overlap of these signals the AND gate 100 will generate a periodic pulse which is illustrated on line 3 of FIG. 3. As previously mentioned, it is desirable to maintain this overlap to be a small fraction of the revolution. A sustained output signal from the AND gate 100 is indicative of the fact that reference position 44 on the spindle 30 is aligned with the stationary reference position 46.

The output signal from the flip-flop 110 is illustrated on line 4 of FIG. 3. A positive signal indicates that the magnet 32 is passing switch 40 while a zero level signal indicates that the magnet is passing switch 42. The pulsed signal portion is characteristic of JK flip-flop and corresponds to the interval of time that both of the switches 40 and 42 are activated.

A positive input signal to the switch 120 from flip-flop 110 will result in placing a positive orient signal on line 140. Similarly a negative signal to switch 120 will cause a negative signal to be output on line 140. The output voltage of the level shifting network 130 illustrating the orient signal is shown on line 5 of FIG. 3. While the orient signal is shown varying between voltage levels of $V_1$ and $-V_2$, it should be understood that the orient signal voltage level is dependent upon the setting of potentiometer 136. It should be noted that the orient signal has a substantially zero average value. In addition, it should also be noted that it is not a requirement of the invention to generate the orient signal during the normal mode of operation. This can be accomplished by selectively disabling the controller 64 during the normal mode.

The orientation mode is initiated when the mode select logic signal, that is, the input to switch 144 is in a low logic level or zero voltage condition. At this time the switch 144 removes the drive voltage $V_3$ and substitutes therefore the orient signal which corresponds to the signal on line 140. At this time the spindle 30 will be retracted from the workpiece in a known manner. It should be noted that during this mode transition interval the spindle as still rotating at the the rate determined by the driving signal $V_3$. After the application of the orient voltage signal to the spindle drive 80 and because the average value of the orient signal is essentially zero, the spindle 30 will rapidly decelerate towards a zero rotational velocity, in a manner as if power were disconnected. As the spindle 30 decelerates the waveform on line 6, FIG. 3 will resemble a variable pulse width signal having an increasing duration that is proportional to the spindle rotational speed. The frequency of this signal at high rotational rates is such as to exceed the bandwidth of the servomotor drive 78, consequently, the spindle drive 80 will not react to this pulsed signal. As the spindle speed approaches zero velocity, the average value of the signal on line 76 is no longer zero and the frequency of oscillation will be lowered, thus permitting the drive 78 to cause motor 80 to follow this signal. As the spindle 30 slows sufficiently, the positive or negative orient signal will cause the spindle drive 30 to rotate the spindle 30 clockwise or counterclockwise about the reference position to enable the system to quickly seek the final orient or reference position. During orient the AND gate 100 will generate a continuous electrical pulse. This pulse will be communicated to the processor 70 via the time delay circuit 102 to indicate that orient has been accomplished.

In addition, during orient, since the signals from both switches are present, the flip-flop 110 will continue to generate a series of output pulses at the clock frequency rate. This series of pulses causes the orient signal to continuously oscillate between the reference voltages established by the the level shifting circuit 136. The average value of these oscillations, during orient, is zero. This oscillation tends to establish an electrically stable and firm orient position.

Changes and modifications in the above described embodiment of the invention can of course be carried out without departing from the scope thereof. Accordingly, that scope is intended to be limited only by the scope of the appended claims.

What is claimed is:

1. A reorientation system for a machine tool having a normal and an orientation mode of operation, comprising:
    spindle means, including a spindle for rotating relative to a stationary portion of the machine tool in response to electrical signals input thereto, said spindle means including a first reference indicator located on said spindle and situated perpendicular to the axis of rotation of said spindle, and a stationary second reference indicator located upon said stationary portion wherein when said first reference indicator is colinear with said second reference indicator, when said spindle has achieved a reoriented or reference position;
    signal generating means comprising:
        a half-pound magnet attached to said spindle and mounted relative to the first reference indicator such that the ends of said half-round magnet are aligned to the first reference indicator;
        a pair of opposingly mounted magnetic switches magnetically coupled to said magnet and mounted to said stationary portion and aligned relative to the second reference indicator for generating a first signal when said first magnetic switch is activated by said magnet, and a second signal when said second magnetic switch is activated by said magnet;
    gating means, responsive to said first and second signals for generating an orient signal wherein said orient signal has a first level during a first interval of time corresponding to the presence of said first signal, a second level during a second interval of time corresponding to the presence of said second signal and oscillates between said first and said second levels during a third interval of time corresponding to the simultaneous occurrence of said first and said second signals;
    controller means for supplying to said spindle means driving signals during the normal mode of operation to cause said spindle means to rotate at a predetermined speed in a predetermined direction and for supplying to said spindle means during the orientation mode said orient signals to cause said spindle means to be aligned to the reference orientation.

2. The system defined in claim 1 wherein said gating means comprises:
   logic means adapted to receive said first and said second signals for generating a first d.c. output signal during the first time interval and a second d.c. output signal during the second time interval and for generating a third output signal, during the third time interval, having a predetermined frequency and having a magnitude oscillating between said first and said second d.c. output levels; and
   clock means connected to said logic means for determining the frequency of oscillation.

3. The system as defined in claim 2 wherein said controller means comprises:
   first switch means, adapted to receive a driving signal of a predetermined polarity and the output signals from said logic means, for generating an output signal comprising either said driving signal or said output signals in correspondence with a signal defining the operational mode of said system.

4. The system as defined in claim 3 wherein said gating means further includes:
   level shifting means interposing said logic means and said first switch means for changing the level of said output signal from said logic means.

5. The system as defined in claim 4 wherein said logic means is a J-K flip-flop.

6. The system as defined in claim 5 wherein said first and said second reference indicators comprises lines intersecting the axis of rotation of said spindle.

7. The system as defined in claim 6 wherein said spindle means includes:
   drive means for driving said spindle in correspondence with the output of said first switch means.

8. The system as recited in claims 6 or 7 further including:
   indicator means for generating an indication signal when said first and said second reference indicators are aligned one to the other.

9. A reorientation system for a machine tool having a normal and an orientation mode of operation;
   a spindle for rotating relative to a stationary portion of the machine tool in response to electrical signals input thereto, said spindle means including a first reference indicator located on said spindle and situated perpendicular to the axis of rotation of said spindle, and a stationary second reference indicator located upon a stationary portion of the machine tool wherein when said first reference indicator is colinear with said second reference indicator said spindle has achieved a reoriented or reference position;
   driving means for driving said spindle at a predetermined speed during the normal mode of operation in response to a driving signal;
   means operative during the normal mode for supplying to said driving means driving signals;
   first means operatively connected to said spindle for generating a periodic first signal having a substantially zero value during the normal mode of operation and wherein each zero crossing of said first signal is generated in correspondence with the alignment of said first reference indicator to said second reference indicator;
   second means responsive to said first signal for stopping and for aligning said spindle to the reference position including;
   means operative during the orientation mode, for removing the driving signal from said driving means and substituting therefor the first signal; and wherein the first reference indicator is a line that is perpendicular to the axis of rotation of said spindle and further divides each rotation of said spindle into two substantially equal first and second angular intervals and wherein said first means includes:
   means for generating said first signal having a first signal level during the interval of time that said first angular interval is passing a predetermined point on said second reference indicator and for generating a second signal level during the interval of time that said second angular interval is passing said predetermined point.

10. The system as defined in claim 9 wherein said first means further includes:
    means for causing said first signal to oscillate between said first and said second signal levels proximate the transition of each of said angular intervals passed said predetermined point.

* * * * *